United States Patent
Milch et al.

(10) Patent No.: US 6,356,881 B1
(45) Date of Patent: Mar. 12, 2002

(54) PAY PER WASH LAUNDRY SYSTEM

(75) Inventors: Neal Milch, Woodmere, NY (US); Ragnar Jawerth, Ljungby (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/534,086

(22) Filed: Mar. 23, 2000

Related U.S. Application Data

(63) Continuation of application No. 09/161,293, filed on Sep. 28, 1998.

(51) Int. Cl.[7] .............................. G06F 17/60; G06K 5/00
(52) U.S. Cl. .......................... 705/41; 705/17; 235/379; 235/380; 235/381
(58) Field of Search ................................. 235/380, 381, 235/379; 705/41, 400, 1, 17, 39; 194/210, 9

(56) References Cited

U.S. PATENT DOCUMENTS

| | | | |
|---|---|---|---|
| 4,663,538 A | * 5/1987 | Cotton et al. .................. | 307/38 |
| 5,225,977 A | * 7/1993 | Hooper et al. ................. | 705/41 |
| 5,280,423 A | * 1/1994 | Imai et al. .................... | 364/140 |
| 5,619,614 A | * 4/1997 | Payne et al. .................... | 395/3 |
| 5,668,876 A | * 9/1997 | Falk et al. .................... | 380/271 |
| 5,799,281 A | * 8/1998 | Login et al. ................... | 705/1 |
| 5,936,221 A | * 8/1999 | Corder et al. ................ | 235/380 |
| 6,157,313 A | * 12/2000 | Emmermann .......... | 340/825.31 |
| 6,167,387 A | * 12/2000 | Lee-Wai-Yin ................ | 705/41 |

FOREIGN PATENT DOCUMENTS

| EP | 0749078 A1 | * 12/1996 |
|---|---|---|
| JP | 02099451 A | * 4/1990 |

OTHER PUBLICATIONS

Kelly; "Car wash payment options increase with recent technological advance"; Nov. 1998; National Petroleum News; v90n12 PP: 54–56; Dialog file 15, Accession No. 01728707.*

Raskin; " In the cards" Nov. 1998; (Inc. Technology Supplement) PP: 120–123; Dialog file 15, Accession No. 01732174.*

Lange; "Clean machines: Computers change coin–operated laundromats to plastic debit card"; Dec. 1993; Daily Record–Wooster; Dialog file 635, Accession No. 0467020.*

* cited by examiner

*Primary Examiner*—Tariq R. Hafiz
*Assistant Examiner*—Romain Jeanty
(74) *Attorney, Agent, or Firm*—Dickstein Shapiro Morin & Oshinsky LLP

(57) ABSTRACT

In accordance with the invention, an appliance is provided with a controller that stores "points" representing payments made towards the purchase or use of the appliance. Every time the appliance, for example, a washing machine, performs a cycle, a portion of the stored points are debited from a stored balance. The institution purchasing the washing machine thus pays for the machine over each wash cycle. When the balance of the stored points reaches zero, or is less than the number of points needed to perform a particular machine function, the machine becomes inoperable. In order for the institution to regain use of the machine additional points must be added to the stored point balance.

10 Claims, 4 Drawing Sheets

PAY PER WASH LAUNDRY SYSTEM

This is a continuation of application Ser. No. 09/161,293, filed Sep. 28, 1998, entitled "PAY PER WASH LAUNDRY SYSTEM," by Neal Milch et al.

BACKGROUND OF THE INVENTION

Commercial or industrial appliances and other equipment may cost an institution multiple times more (purchase price) than similar appliances or equipment made for individual or residential use. In order for an institution, for example, a hospital, to acquire such equipment for its business use, significant capital must usually be paid up-front by the institution. As an alternative, loan or lease arrangements can be made for the appliances that would require fixed periodic (typically monthly) payments to be made regardless of the cash flow or revenue derived by the institution during the period of the arrangement.

Many institutions such as hotels, hospitals, nursing homes or other health care facilities who may benefit from the acquisition of such equipment as commercial laundry systems may not have the financial wherewithal to incur the significant up-front capital costs to acquire such equipment. Moreover, some institutions may not even have adequate periodic cash flow to satisfy loan or lease arrangements for such equipment. The case of a summer camp, which is only open 12 weeks of the year, for example, does not have sufficient cash flow during the 40 weeks of the year in which the camp is closed to meet loan/lease arrangements for the equipment (which may span a number of years).

As a result, many institutions that would benefit from the use of the equipment are in effect prohibited from access to the equipment, or are forced to incur higher costs for outside services that would otherwise be provided by the equipment.

SUMMARY OF THE INVENTION

The invention avoids the necessity of an institution to expend significant capital up-front or incur fixed periodic rent payments under a lease to acquire commercial appliances or equipment. Instead, in accordance with the invention, the cost of acquisition is directly correlated to the utilization of the equipment made by the institution during its regular business operations. Where the institution is a hotel and the commercial equipment is a laundry system, for example, the initial cost of acquiring the laundry system may be limited only to the installation of the system. The cost of purchasing the laundry system can then be tied to the particular use made of the system by the hotel. The unique ability of the invention to tie the acquisition cost of the laundry system to the actual utility of the system greatly enhances the ability of institutions to acquire the system.

In accordance with the invention, equipment is provided with a controller that stores "points" representing payments made towards the purchase or use of the equipment. Every time the equipment, for example, a washing machine, performs a cycle, a portion of the stored points are debited from a stored balance. The institution purchasing the washing machine thus pays for the machine over each wash cycle. When the balance of the stored points reaches zero, or is less than the number of points needed to perform a particular machine function, the machine becomes inoperable. In order for the institution to regain use of the machine additional points must be added to the stored point balance.

A user or institution attempting to replenish a stored point balance may obtain a unique machine code which is generated by the machine. This machine code is submitted to the seller of the machine, together with an additional payment towards the purchase of the machine. The seller inputs the machine code into a system controller, together with the amount of the payment received. The system controller, in accordance with the invention, then generates a unique authorization code for output to the user/institution. This authorization code may be input to the machine to effectuate replenishment of the stored point balance, so as to permit further use of the machine. As a result, the invention realizes a "pay-per-wash" system that allows an institution to acquire a washing machine or other equipment without making any significant up-front payment nor any obligation to make fixed periodic payments.

DETAILED DESCRIPTION OF PREFERRED EMBODIMENTS

The invention will be described in detail with reference to the preferred embodiments illustrated in FIGS. 1, 2a, 2b, 3 and 4. The invention is described herein in its preferred application to laundry machines having washing and/or drying apparatus that provide laundry functions to users in institutions such as hotels, motels, nursing homes, hospitals (and other health care facilities), schools, clubs, commercial laundry outlets, pharmaceutical (and other manufacturing) plants, and any other known institutions employing laundry systems. However, the invention may be applicable to any type or configuration of appliance or equipment that encounters the same or similar problems overcome by the invention described herein.

Figure 1:
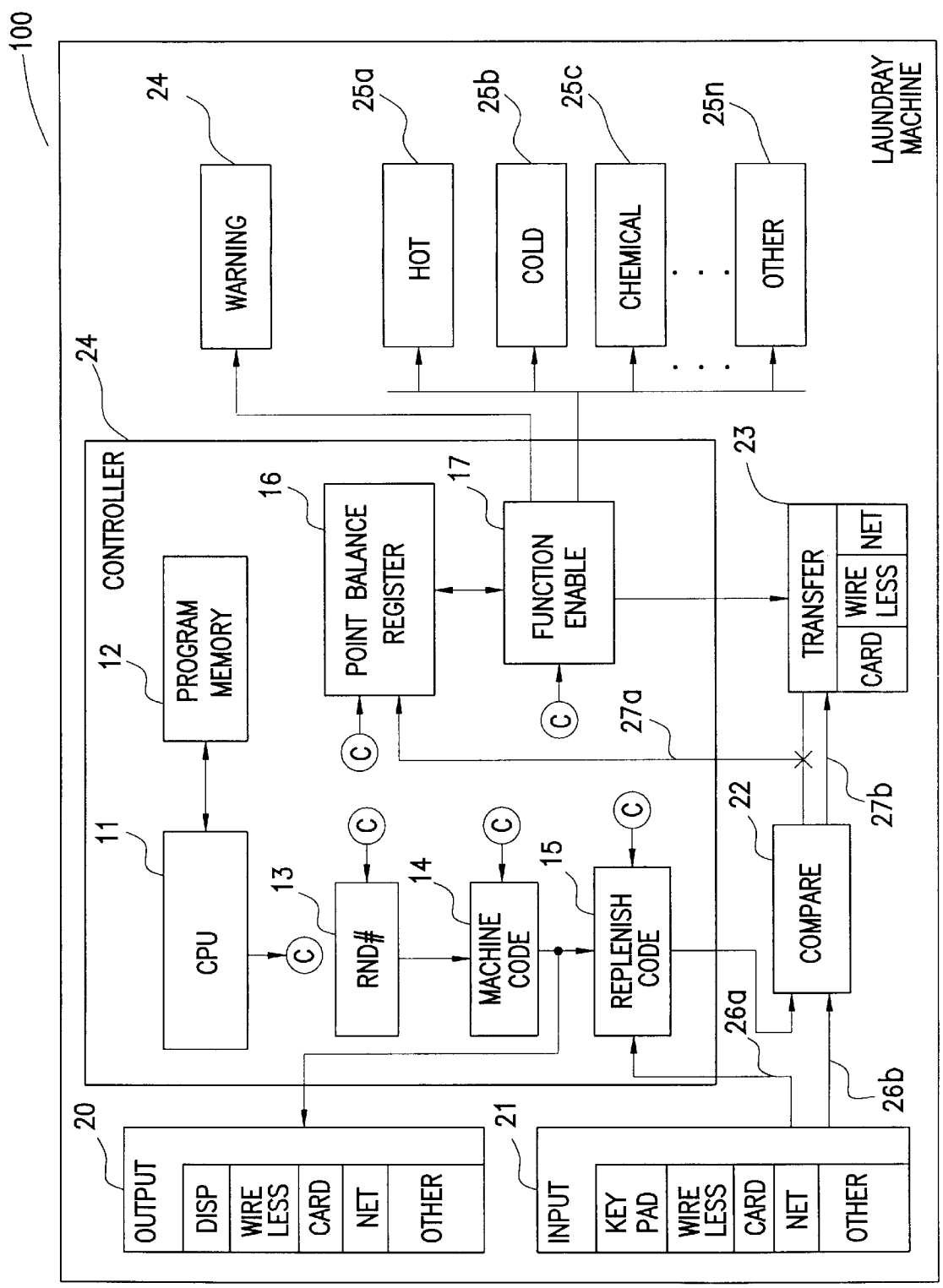
FIG. 1 is a logic block diagram illustrating an appliance in accordance with a preferred embodiment of the invention.

In accordance with the invention, a laundry machine 100 is provided that is capable of performing laundry functions including hot water wash 25a, cold water wash 25b, chemical wash 25c, hot air dry, cold air dry, chemical dry, drain, extraction, as well as any other laundry function 25n known in the art, or combination of such functions as shown in FIG. 1. The operation of the functions 25a . . . 25n are controlled by controller 10, particularly, the function enable component 17 of controller 10. Where the function enable component 17 activates a selected laundry function, by issuing an enable signal to one or more laundry function components 25a . . . 25n, the laundry machine 100 performs the selected laundry functions in the well known manner. The extent to which function enable component block 17 may enable the use of laundry machine 100 by an institution, however, depends on the extent to which the laundry system is authorized to perform the selected function(s), as will be described below.

In accordance with the invention, a controller 10 is provided to oversee the system control of the laundry machine 100. At the heart of the controller 10 is a central processing unit (CPU) 11 and its associated program memory 12. CPU 11 controls (directly or indirectly) all of the functional components in the laundry machine. A point balance register 16 is provided to store "point values" that represent the extent to which the institution has paid for use of the laundry machine 100.

Figure 2A:
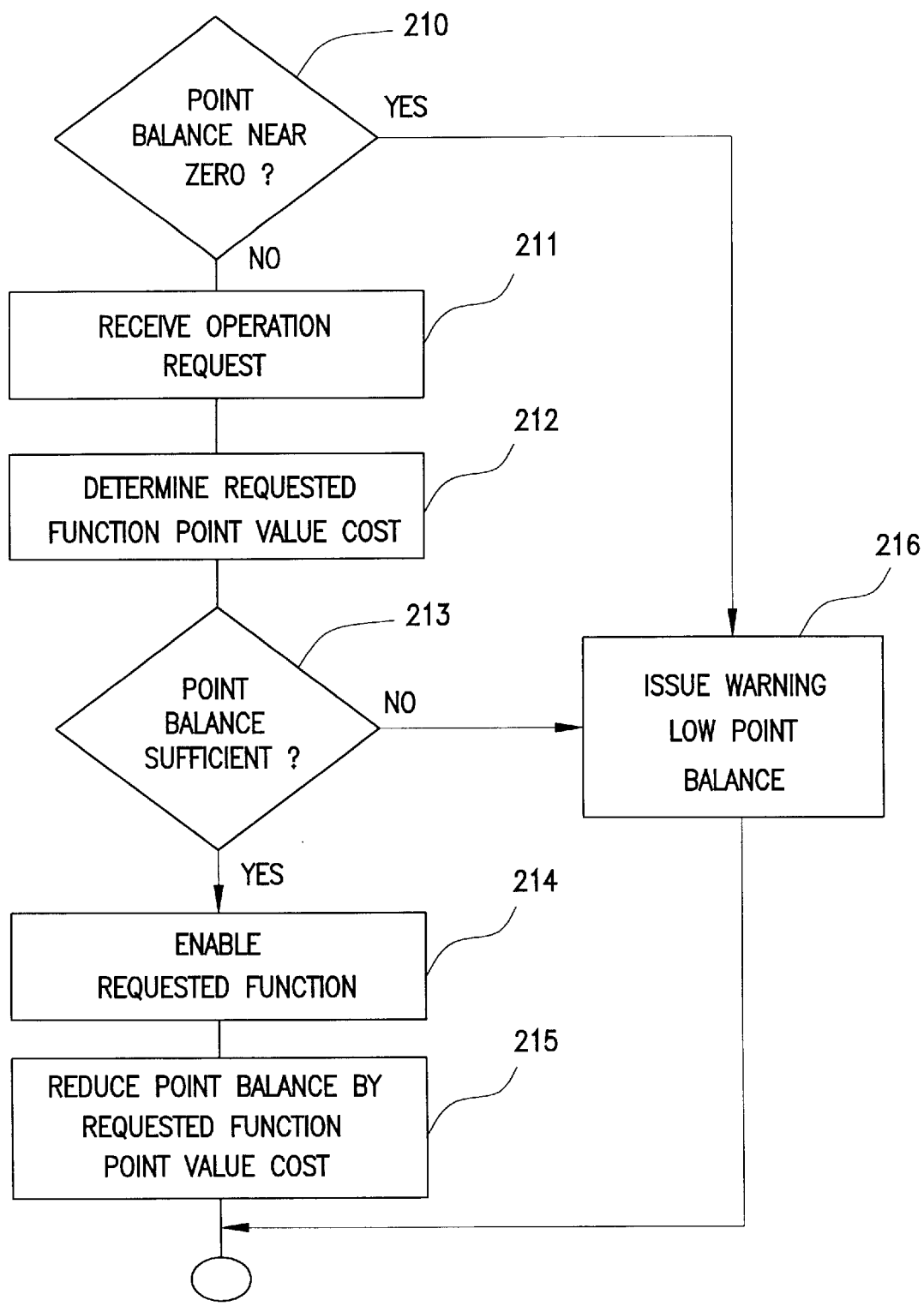
FIG. 2a is a flowchart illustrating operation of the function enable component in the controller of FIG. 1 in accordance with the invention.
Figure 2B:
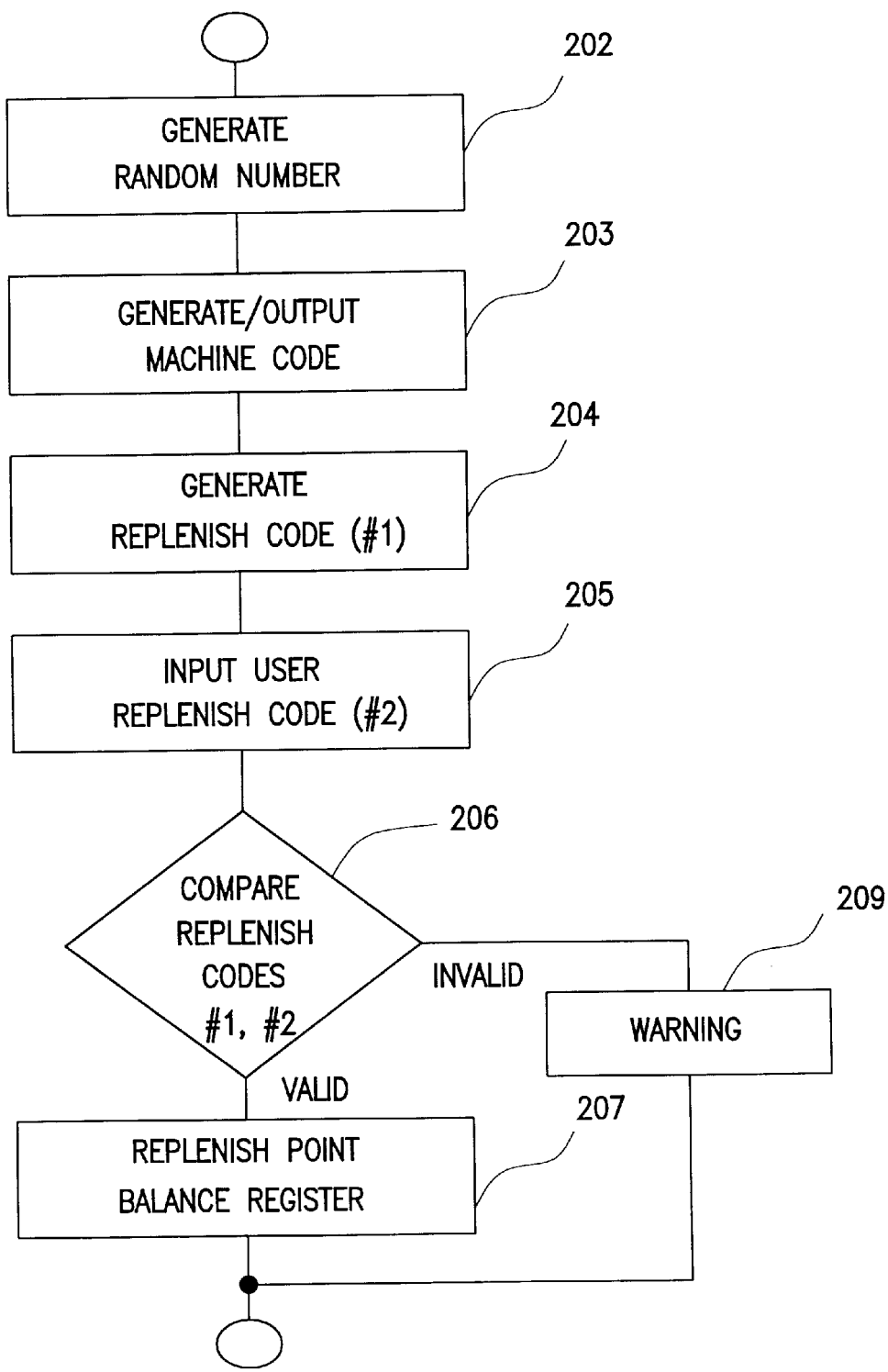
FIG. 2b is a flowchart illustrating operation of the controller unit of FIG. 1 in accordance with the invention.

The laundry machine controller 10 is programmed to manage the operation of the laundry machine as follows (illustrated in FIG. 2a). A laundry function may be performed on the laundry machine 100 whenever there is a sufficient "point value" balance stored in the point balance register 16 to cover the "point cost" of a requested operation. An initial check to determine whether the balance is near zero is performed prior to detecting the presence of any operational request (step 210). Upon request for execution of one or more selected ones of the number of laundry functions available on the laundry machine 100 (step 211), as received through input device 21, function enable component 17 will first determine whether a sufficient point value balance is stored in register 16.

For each one of the number of laundry functions (25a . . . 25n) available, an individual point value cost is associated with that function. The assignment of point value costs is made by the equipment provider, typically before shipment of the machine, depending on the expected utilization and incidental costs required to implement each laundry function. The point value costs would likely, for example, reflect an amortization of the price of the machine and may also include the associated costs of operation such as hot and cold water consumption, chemical consumption, electrical consumption, gas consumption, duration of cycle, anticipated service associated with wear and tear on the machine (e.g., "service contract"), and any other costs as established by the equipment provider.

For each of the selected laundry functions, the function enable component 17 will determine the point value cost or retrieve from memory a pre-assigned point value cost associated with the selected function (step 212). Function enable component 17 will use the associated point value cost as a minimum threshold point value balance in determining whether the point balance stored in register 16 is sufficient to permit enablement of that laundry function (step 213). Where the point value balance stored in the point balance register 16 at least meets the minimum threshold for a particular function, function enable component 17 will issue an enable signal to that function component (25a . . . 25n) to activate the particular laundry function requested by the user of the laundry machine 100 (step 214).

Where the minimum threshold for a function is not met by the point value balance stored in register 16, function enable block 17 will activate warning mechanism 24 (step 216). This mechanism is preferably a visual, audible, tactile, or other known sensory perceptible altering device that is capable of informing a user that the laundry machine 100 is not authorized to perform the requested function. The warning mechanism may supply the warning independent of output component 20, as part of output component 20, or both.

Once function enable component 17 activates a selected laundry function (25a . . . 25n), function enable component 17 reduces or debits the point value balance stored in point balance register 16 by an amount equal to the point value cost associated with the enabled function (step 215). If function enable component 17 detects that the point value balance stored in point balance register 16 is at or near (i.e., within a predetermined number of) a zero balance (step 210), the warning mechanism 24 may be enabled (step 216). A zero balance in the point balance register 16 may render the laundry machine completely inoperative, or at least for any additional functions, and thus, the user must be informed of this fact.

Additional points would then be required before the user or the institution may further use the laundry machine 100. As a result, should the institution default on any payment obligations to the machine provider once the point value balance is less than that needed to enable the machine function with the lowest point cost, the institution will no longer have use of the machine, and will thus gain no benefit until it restores its payment obligations.

As is readily apparent, in accordance with the invention, the cost of purchase of a laundry machine is directly tied to the use of the machine made by the purchasing institution. Payment is thus allocated per each wash or other laundry cycle rather than as an up-front cost or a fixed installment over a payment period. The use of the point value balance in point balance register 16 implements this aspect of the invention. For each payment made by the institution, additional "points" can be stored in the point balance register, thus enabling further use of the machine. Where the institution anticipates a certain period of use of the machine, it can purchase "points" to ensure that the machine is available during that period. In contrast, where the institution anticipates a period of non-use, it may allow the point value balance to decrease to (or near) zero until such time as further use will be required. Because no up-front capital investment is made nor fixed payment schedule arranged, the institution is not forced to allocate revenue to assets that, at least during the period of non-use, have no utility or benefit to the institution.

The point value balance stored in point balance register 16 may be updated or replenished in many ways, two of which are described below. The primary manner in which the point value balance is replenished is through the input of authorized replenishment codes, sold to the institution using the machine by the point seller (e.g., the equipment provider). To this end, controller 10 is programmed to perform the following operation (illustrated in FIG. 2b).

Controller 10 employs three mathematical algorithm-based code or number generators: random number generator 13; machine code generator 14; and replenish code generator 15. First, random number generator 13 generates a random number "seed" that serves as an input to machine code generator 14 (step 202). Preferably, based in part on the "seed" from random number generator 13, and other terms (e.g., laundry machine serial number), a unique equipment or machine code is generated in machine code generator 14 (step 203). As discussed above, it is this machine code that is submitted to the point seller with a request for a particular quantity of additional points that will result in issuance of an authorization or replenishment code by the point seller that increments point balance register 16 by that number of points and enables further use of the machine. This machine code is taken by replenish code generator 15 to internally generate a unique authorization or replenish code (step 205) matching the one to be generated by the point seller (and given to the user upon receipt of additional payment) (step 204).

At the time the user wishes to replenish the stored point balance, so as to permit further use of the machine, the user inputs the authorization or replenish code given by the seller in response to the machine code, point request (and payment). Upon receiving an input user replenish code (step 205), the internally generated replenish code from replenish code generator 15 is compared in unit 22 with the input user replica of the replenish code (step 206). As will be described in more detail below, only a user or institution making some payment toward the purchase or use of the machine (possibly through previous purchase(s) of points) will be provided with a proper or valid replenish code that compares favorably with the code generated by replenish code generator 15. Upon detection by compare unit 22 of an input of a valid replica of the replenish code (i.e., matching or meeting requirements defined by the replenish code output by replenish code generator 15), the compare unit will effectuate over line 27a an update or replenishment of the point value balance stored in the point balance register 16 in an amount equal to that requested by the point purchaser (step 207). In the preferred embodiment, the replica of the replenish code output by the system operator (e.g., point seller) is masked by, embedded with, or otherwise encoded with the amount of payment made (or point count requested) by the user to effectuate further use of machine 100. This payment amount must be extracted from the replica replenish code entered into input device 21 by the user before a comparison can be made in compare unit 22. Preferably, compare unit 22 is configured to extract the payment amount (or point count) data from the input replica replenish code and derive the portion of the code that is to be compared with the output of local replenish code generator to determine whether the input code is valid. If the input replica of the replenish code is invalid, a warning can be issued (if desired) using any variety of mechanism, including warning device 24 or an equivalent mechanism (step 209). In the event that a pre-determined number of invalid input codes are entered, the machine may activate a security process including disabling the replenishment function for a period of time. As a secondary manner of updating the point value balance, a transfer unit 23 is provided for transferring point value balances from other machines or accounts of the user, institution or other third parties. Provided that a valid replica of the replenish code is input as detected by compare unit 22, compare unit 22 will issue a transfer enable signal 27b permitting the transfer unit to effectuate over line 27a update or replenishment of the point value balance stored in point balance register 16, in the same manner as previously described. The amount to be transferred, however, may be stored on a smartcard and read into the system using a card reader in the transfer unit 23. The transferred amount may also be sent to transfer unit 23 over a wireless or network link from another laundry machine, appliance, equipment, or other transferring mechanism (such as a remote computer, for example).

A reverse transfer using this same transfer unit 23 may also be effectuated. In the "reverse" transfer mode, a portion (or all) of the point value balance stored in the point balance register 16 is debited from register 16 without any associated activation of a laundry function. This operation may be required by an institution that wishes to reallocate points from one machine to another or obtain credit (if available) from the point seller. After the proper authorization code is input, in the manner described above, function enable component 17 effectuates transfers via transfer unit 23 to a smartcard, wireless or network link, or any other known receiving device that can store or transmit the transferred point value balance for later or immediate transfer into another laundry machine or the like.

In accordance with the above described method of replenishing point balance register 16, the invention also contemplates the possibility to include in the replenishment process the ability for the machinery provider to alter the point value cost of one or more machine functions. This point value cost change may be effected by encoding the desired change into the authorization or replenishment code entered by the point purchaser or transferred to the machine through a modality of transfer unit 23. The invention further contemplates the possibility that point balance register 16 may be remotely located and accessed by the machine through a modality of transfer unit 23, one possible embodiment being comprised of a "pre-paid point card".

Figure 3:
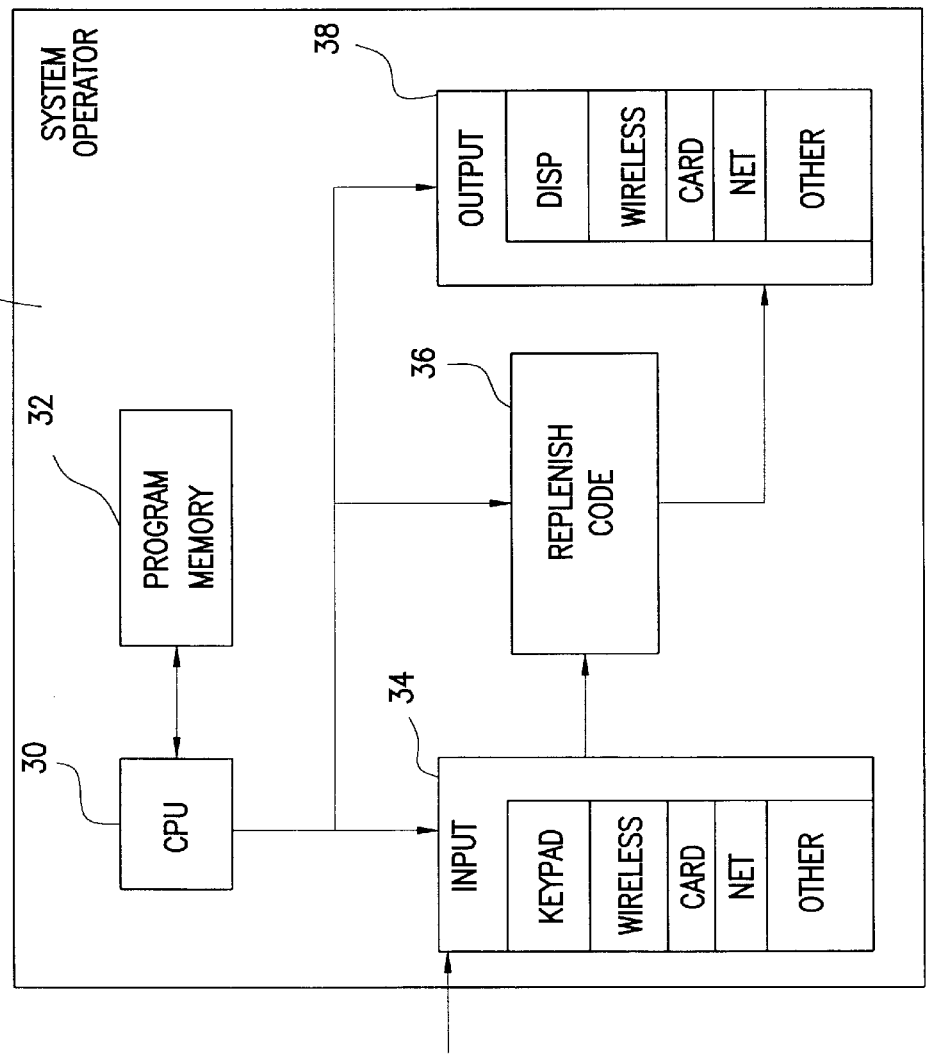
FIG. 3 illustrates a preferred embodiment of the system operator of the invention.

As will be described in more detail below with respect to FIG. 3, before the user or institution can be issued the proper replica of the replenish code needed to update the point value balance in the point balance register 16, the user may be required to submit payment, together with a replica of the unique machine code generated by machine code generator 14 to a point seller's system operator. Accordingly, the machine code generated by machine code generator 14 is output to the user through output device 20. Preferably, output device 20 is a video display mounted on the laundry machine 100. Alternatively, however, any suitable output device may be used, including: a wireless (e.g., radio frequency (RF), infrared, etc.) transmitter to a portable user receiver; a card recorder writing to a recording medium on a card apparatus; a communication line to a user remote location (or directly to the point seller) through a public network such as the Internet or an institution-based network such as LAN, intranet, etc.; or any other output device known to those of ordinary skill in the art.

A user or institution desiring to make a payment towards the purchase of the laundry machine 100 in order to allow replenishment of the point value stored in the machine's point balance register 16 must submit a request for a quantity of points, and possibly the required payment through any known manner to the point seller, together with a replica of the machine code output by output device 20. After receiving payment, the seller will provide the user with an authorization or replenish code. The system operator 300 (FIG. 3) itself may be custom equipment containing specific hardware, software, or both, for use in authorizing use of the laundry machine 100, or it may be a general purpose computer having CPU 30 executing an authorization program stored in program memory 32.

Figure 4:
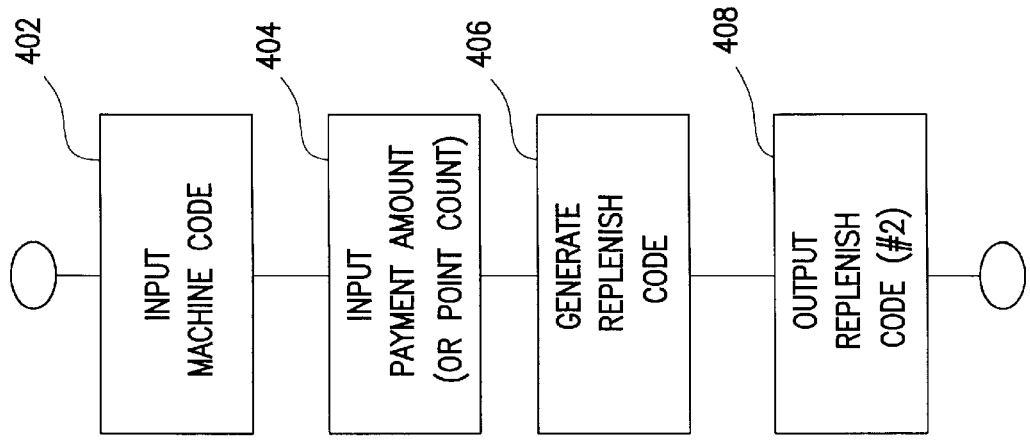
FIG. 4 is a flowchart illustrating the operation of the system operator of FIG. 3 in accordance with the invention.

In any event, the system operator 300 is programmed to perform the following operation (illustrated in FIG. 4). Through input device 34 a replica of the machine code issued by laundry machine 100 (step 402), together with an amount of payment made toward the purchase or use of laundry machine 100 (step 404) is input to the system operator 300. In the preferred embodiment, input device 34 is a well known keypad entry device which may be used by the seller itself or the user to input some or all of the required information. In the alternative, the input device may receive the input information from the user over a wireless link, a smartcard, an internal or external network, or any other mechanism known in the art.

Based on the input number of points and/or payment amount and replica machine code, replenish code generator 36 generates a replica of the authorization or replenish code for comparison to that generated in the replenish code generator 15 of laundry machine 100 (step 406). This replica of the replenish code is then output to the user via output device 38 (step 408). Preferably the output device is a video display that can be accessed by the point seller or the user/institution. Alternatively, the output device may provide the replica of the valid replenish code to the user or institution through a wireless link or network link, as is well known in the art. As described above, the user/institution can then take the replica of the replenish code issued by the system operator 300 and input the replenish code into laundry machine 100 to replenish the point value balance stored in its point balance register 16 so as to permit the laundry machine 100 to be used further (or to permit transfer of points to or from the machine).

While the invention has been described in detail in connection with the best mode of the invention currently known, it should be readily understood that the invention is not limited to the specified embodiments described herein. Rather, the invention can be modified to incorporate any number of variations, alterations, substitutions or equivalent arrangements not heretofore described, which are commensurate with the spirit and scope of the invention. For example, although various functional blocks in laundry machine 100 and system operator 300 are shown, it is apparent that one or more blocks may be combined in hardware, software, or both to perform many (if not all) of the acts and functions of the blocks described herein. Also, the CPU and program memory may be eliminated as distinct elements by incorporating them into one or more of the circuits or components implementing the functional blocks shown.

Functional blocks 25a . . . 25n of laundry machine 100 are described herein as directly representing discrete laundry functions such as hot water wash, cold water wash, etc. In the alternative, the components may represent the utility elements used to perform the laundry functions such as the gas, electricity or other heat generating elements required to produce hot water (for washing) or hot air (for drying), etc.

Although the input and output devices in laundry machine 100 and the input and output devices in system operator 300 are directed to receiving and transmitting information from and to the user or institution, it should be readily apparent that the input/output devices of the laundry machine 100 can be modified to exchange the same information directly with the output/input devices of the system operator 300.

In addition, the invention thus described may also be modified by requiring the user to input a payment amount (or requested point count) into the laundry machine together with the replica of the replenish code issued by the system operator (point seller). The compare unit 22 (or other device) may be relieved of its task of extracting the payment amount information from the input replica replenish code. (In the alternative, the payment amount may still be extracted but used as an additional point of comparison with the input amount.)

Accordingly, the invention is not limited by the foregoing description, but is only limited by the scope of the appended claims.

What is claimed as new and desired to be protected by Letters Patent of the United States is:

1. A laundry system for use in providing a plurality of laundry functions, the laundry system comprising:
   a laundry machine executing the plurality of laundry functions of the laundry system, the laundry machine comprising:
   a first input device;
   random number generator;
   machine code generator which generates a unique machine code based on a random number generated by said random number generator;
   first output device which generates an output based on the machine code not previously contemplated but possible generated by said machine code generator;
   first replenish code generator, coupled to said first input device, which generates a replenish code based on the machine code generated by said machine code generator and a payment amount or point count received by said first input device;
   point balance register storing a current point value for the laundry machine;
   compare unit which, upon detection of a valid replenish code input to said first input device, replenishes the point value stored in said point balance register in accordance with the payment amount or point count input to said input device; and
   function enable unit, coupled to said point balance register,
   detecting a requested one of the plurality of laundry functions provided by the laundry system based on requests for function input by said first input device, and determining whether said point balance register contains a sufficient point value balance to satisfy the point value cost of the requested function, wherein said function enable unit issues an enable signal for the requested function upon detection of a point value balance in said point balance register at least matching the corresponding point value cost for each requested function, said function enable unit reducing the point balance stored in said point balance register in accordance with the point value cost of each requested function upon issuing an enable signal;
   a system operator authorizing operation of said laundry machine, the system operator comprising:
   a second input device which receives a replica of the machine code generated by said machine code generator, and receives a point count or payment amount;
   a second replenish code generator, coupled to said second input device, which generates a user replenish code based on the machine code replica and point count or payment amount input by said second input device; and
   a second output device, coupled to said second replenish code generator, which outputs the user replenish code generated by said second replenish code generator for use in replenishment of point values stored in said laundry machine so as to enable execution of requested ones of the plurality of laundry functions by said laundry machine.

2. The laundry system as recited in claim 1, wherein the plurality of laundry functions include hot water wash, cold water wash, hot air dry, cold air dry, drain, extraction, and chemical additives.

3. The laundry system as recited in claim 1, wherein the laundry machine further comprises a warning unit for issuing warning outputs;
   wherein said function enable unit enables said warning unit upon detection that said point balance register has reached a preset balance, the preset balance including:
   a zero point value balance; or
   a balance within a predetermined point value of a zero point value balance; or
   a balance less than the point cost value corresponding to the requested function.

4. The laundry system as recited in claim 1, wherein said first input device is a keypad located on the laundry machine, wherein the payment amount is represented by a point count, and wherein said first output device is a display located on the laundry machine.

5. The laundry system as recited in claim 1, wherein said system operator is a general purpose personal computer having a central processing unit and a program memory.

6. The laundry system as recited in claim 5, wherein said second input device is a keyboard of the personal computer, and said second output device is a display of the personal computer.

7. The laundry system as recited in claim 1, wherein a valid replenish code is identified by said compare unit when the replenish code generated by said first replenish code generator and a user replenish code input to said first input device are determined to meet predetermined criteria.

8. An equipment control method for use in performing a plurality of equipment functions, the method comprising the steps of:

generating an equipment code;

generating an authorization code;

comparing the generated authorization code with an input authorization code;

generating a point value update control signal when it is determined that the generated authorization code and the input authorization code meet predetermined criteria;

storing in a point balance storage unit a point value balance, wherein the stored point value balance in said point balance storage unit is updated in response to the point value update control signal;

detecting that the point value balance in the point balance storage unit at least meets a function cost point value; and outputting function control signals activating selected ones of the plurality of equipment functions upon detection that the point value balance at least meets the function cost point value of the selected functions;

wherein the plurality of equipment functions are respectively associated with individual function cost point values, and wherein the method further comprises the step of detecting, for each selected one of the equipment functions, whether the associated individual function cost point value is met by the point value balance stored in the point balance storage unit.

9. The equipment control method as recited in claim 8, the method further comprising the step of issuing a warning signal indicating failure of the stored point value balance to meet the function cost point value for selected ones of said equipment functions.

10. A method of providing a plurality of laundry functions, the method comprising the steps of:

(a) generating a random number;

(b) generating a unique machine code based on the random number generated in said generating step (a);

(c) generating an output based on the machine code generated by said generating step (b);

(d) generating a replenish code based on the machine code generated in said generating step (c) and a point request or input payment amount;

(e) storing a current point value in a point balance register;

(f) comparing the replenish code generated in said generating step (d) and an input user replenish code;

(g) replenishing the point value stored in said point balance register in accordance with the input point request or payment amount;

(h) detecting a requested one of the plurality of laundry functions based on input requests for function, and determining whether said point balance register contains a threshold point value balance at least equal to the point value cost for the requested function;

(i) enabling the requested function by issuing an enable signal upon detection of a point value balance in said point balance register at least matching the corresponding threshold for the requested function;

(j) reducing the stored point balance in accordance with the point value cost corresponding to the requested function upon issuance of the enable signal in said enabling step (i);

(k) receiving a replica of the machine code generated in said generating step (c), possibly accompanied by a point request or payment amount;

(l) generating a user replenish code based on the machine code replica and point request or payment amount received in said receiving step (k); and (m) outputting the user replenish code generated in said generating step (l) for use with replenishment of point values stored in the point balance register so as to enable execution of requested ones of the plurality of laundry functions.

* * * * *